(12) United States Patent
Bartos et al.

(10) Patent No.: US 6,651,695 B2
(45) Date of Patent: Nov. 25, 2003

(54) DIAPHRAGM-OPERATED PRESSURE REGULATING VALVE

(75) Inventors: Josef A. Bartos, Pomona, CA (US); Harsharan Grewal, Diamond Bar, CA (US)

(73) Assignee: GAAP Gas Controls, LLC, Pomona, CA (US)

( * ) Notice: Subject to any disclaimer, the term of this patent is extended or adjusted under 35 U.S.C. 154(b) by 0 days.

(21) Appl. No.: 10/119,199

(22) Filed: Apr. 9, 2002

(65) Prior Publication Data

US 2003/0188782 A1 Oct. 9, 2003

(51) Int. Cl.[7] .................... G05D 16/06; F16K 31/524
(52) U.S. Cl. .................. 137/505.46; 251/257; 251/263
(58) Field of Search ............... 137/505.46, 505.47; 251/251, 257, 263

(56) References Cited

U.S. PATENT DOCUMENTS

| | | |
|---|---|---|
| 359,787 A | 3/1887 | Hyams |
| 742,775 A | 10/1903 | Dixon |
| 746,879 A | 12/1903 | Reynolds |
| RE17,738 E | 7/1930 | Groble |
| 1,934,548 A * | 11/1933 | Kellogg .................. 137/505.13 |
| 2,338,760 A | 1/1944 | Deming |
| 2,701,578 A | 2/1955 | Hamilton |
| 3,038,493 A * | 6/1962 | Griffith .................... 137/505.25 |
| 3,056,424 A | 10/1962 | Courtot et al. |
| 3,204,660 A * | 9/1965 | Nelson et al. ......... 137/505.38 |
| 3,339,581 A | 9/1967 | Courtot |
| 3,368,923 A | 2/1968 | Smith |
| 3,424,194 A * | 1/1969 | Kruzan et al. ......... 137/505.46 |
| 4,862,916 A | 9/1989 | Gaunt |
| 4,974,629 A | 12/1990 | Chang |
| 5,108,069 A * | 4/1992 | Tada et al. .................... 251/58 |
| 5,681,508 A | 10/1997 | Gerhardy |
| 5,735,306 A | 4/1998 | Olds et al. |

* cited by examiner

Primary Examiner—Stephen M. Hepperle
(74) Attorney, Agent, or Firm—Fay, Sharpe, Fagan, Minnich & McKee

(57) ABSTRACT

A diaphragm operated pressure regulating valve for connection between a source of gas under pressure and the point of use comprises an inlet port having an axis, a valve element coaxial with the inlet port and a coaxial ball and cam valve element actuating arrangement controlled by the diaphragm which is transverse to and coaxial with the inlet port.

20 Claims, 2 Drawing Sheets

DIAPHRAGM-OPERATED PRESSURE REGULATING VALVE

BACKGROUND OF THE INVENTION

This invention relates to the art of fluid pressure regulating valves wherein a valve element is diaphragm actuated to control the flow of fluid through the valve and, more particularly to an improved valve element operating arrangement for a diaphragm-operated pressure regulating valve.

It is well known to provide fluid pressure-regulators which operate in accordance with the pressure of fluid acting against a flexible diaphragm between valve housing components to provide a pressure chamber on one side of the diaphragm and a chamber vented to atmosphere on the other. The pressure chamber includes an inlet orifice or port for fluid under pressure from a source and an outlet passage for the flow of gas to a point of use such as, for example, a gas-operated cooking grill. A valve unit controls the flow of fluid through the inlet orifice to the outlet opening and, most often, the valve unit comprises lever arm pivotally mounted in the pressure chamber and having an end connected to the diaphragm for the later to pivot the arm about its axis during operation of the valve. The other end of the lever arm carries a resilient sealing member or valve element which, in response to pivotal displacement of the lever arm, engages and disengages the inlet orifice to respectfully close and open the latter to the flow of fluid into the pressure chamber from the source. Regulating valves of the foregoing character also include a relief valve arrangement by which excessive back pressure into the pressure chamber from the point of use is vented to atmosphere.

The problems encountered in connection with pressure regulators employing the lever arm concept include an undesirably large housing or envelope and therefore a higher than desired cost of manufacturing. In particular in this respect, the length of the lever arm required to obtain the necessary mechanical advantage with respect to controlling the flow of liquid at a given supply pressure requires a large housing or envelope, and the size of the latter increases as the supply pressure increases requiring a larger capacity inlet orifice and liquid flow and a high lever ratio to assure appropriate control of the flow. It follows that any increase in the size of the valve housing increase the cost-thereof as well as the overall cost of the regulating valve. A further problem encountered in connection with lever operated valve elements is performance limitations resulting from the opening and closing arc of the sealing element relative to the inlet orifice and which arc is determined by the length of the lever arm between the pivot axis thereof and the valve element thereon. More particularly in this respect, the displacement of the sealing member or valve element along an arcuate path relative to the inlet orifice makes it extremely difficult to obtain and to then maintain proper seating of the sealing element relative to the orifice. Yet a further problem encountered in connection with pressure regulating valves using the lever concept results from turbulent flow conditions resulting from the fluid flow through the inlet orifice to the pressure chamber and which turbulence causes the lever arm to vibrate and/or oscillate during valve operation causing fluctuating gas flow to the point of use.

SUMMARY OF THE INVENTION

In accordance with the present invention, an improved valve element operating arrangement is provided for a diaphragm-operated pressure regulating valve which eliminates the use of a lever and, in connection with a pressure regulating valve of the same capacity using the lever concept, considerably reduces the size of the valve housing and thus the cost thereof as well as the overall cost of the regulating valve while increasing performance characteristics relative to lever operated valves. More particularly in accordance with the invention, the foregoing attributes are achieved through the use of a valve element which is coaxial with and axially displaceable relative to the inlet orifice and the opening and closing displacement of which is controlled by a ball and cam actuating unit which is coaxial with the inlet orifice and operates in response to displacements of the diaphragm. The ball and cam unit provides the necessary mechanical advantage which in turn provides the operating force against the valve element and the fluid supply pressure for closing the inlet orifice. By having all of the component parts of the actuating unit coaxial with and linearly displaceable relative to the axis of the inlet orifice, the housing or envelope for the valve is considerably reduced in size, and thus cost, relative to a valve of the same capacity employing the lever concept. Moreover, linear displacement of the valve element relative to the inlet orifice advantageously provides for a resilient sealing member on the valve element to engage the orifice transverse to the axis thereof, thus optimizing the obtaining and maintaining of a proper seating of the sealing element against the inlet orifice.

In accordance with another aspect of the invention, the flow of fluid from the inlet orifice to the outlet passage of the valve is through trim orifices, each of which is slightly smaller in diameter than the inlet orifice and which trim orifices function together with the inlet orifice to promote uniform flow, to eliminate vibration and to provide lockout pressure requirements. More particularly in this respect, the trim orifices create a positive pressure or force against the ball and cam components of the actuating unit to eliminate clearances therebetween and thus undesired relative movement therebetween. By reducing lockout pressure, an increase in diaphragm bias spring loading is obtained which results in increased regulated output flow, and this further contributes to a smaller sized regulator and a higher flow rate.

It is accordingly an outstanding object of the present invention to provide an improved diaphragm-operated valve element actuating arrangement which enables decreasing the size and cost of a diaphragm-actuated fluid flow pressure regulating valve in comparison to such valves employing a diaphragm actuated pivotal lever for displacing the valve element relative to the inlet orifice of the valve.

Another object is to provide a diaphragm actuated pressure regulating valve in which the valve element is coaxial with and axially displaceable relative to the inlet orifice of the valve and wherein the valve element actuating unit is coaxial with the valve element and operated by displacement of the diaphragm.

A further object is the provision of a diaphragm actuated pressure regulating valve of the foregoing character which is structurally simple, of minimal size with respect to a given flow capacity, and which costs less to manufacture than diaphragm actuated fluid flow pressure regulators heretofore available.

Yet a further object is the provision of a diaphragm actuated fluid flow pressure regulating valve of the foregoing character in which the diaphragm operated valve element actuating unit is comprised of ball and cam components operatively interconnected with the valve element for controlling displacement thereof in response to displacements of the diaphragm.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF PREFERRED EMBODIMENTS

Figure 1:
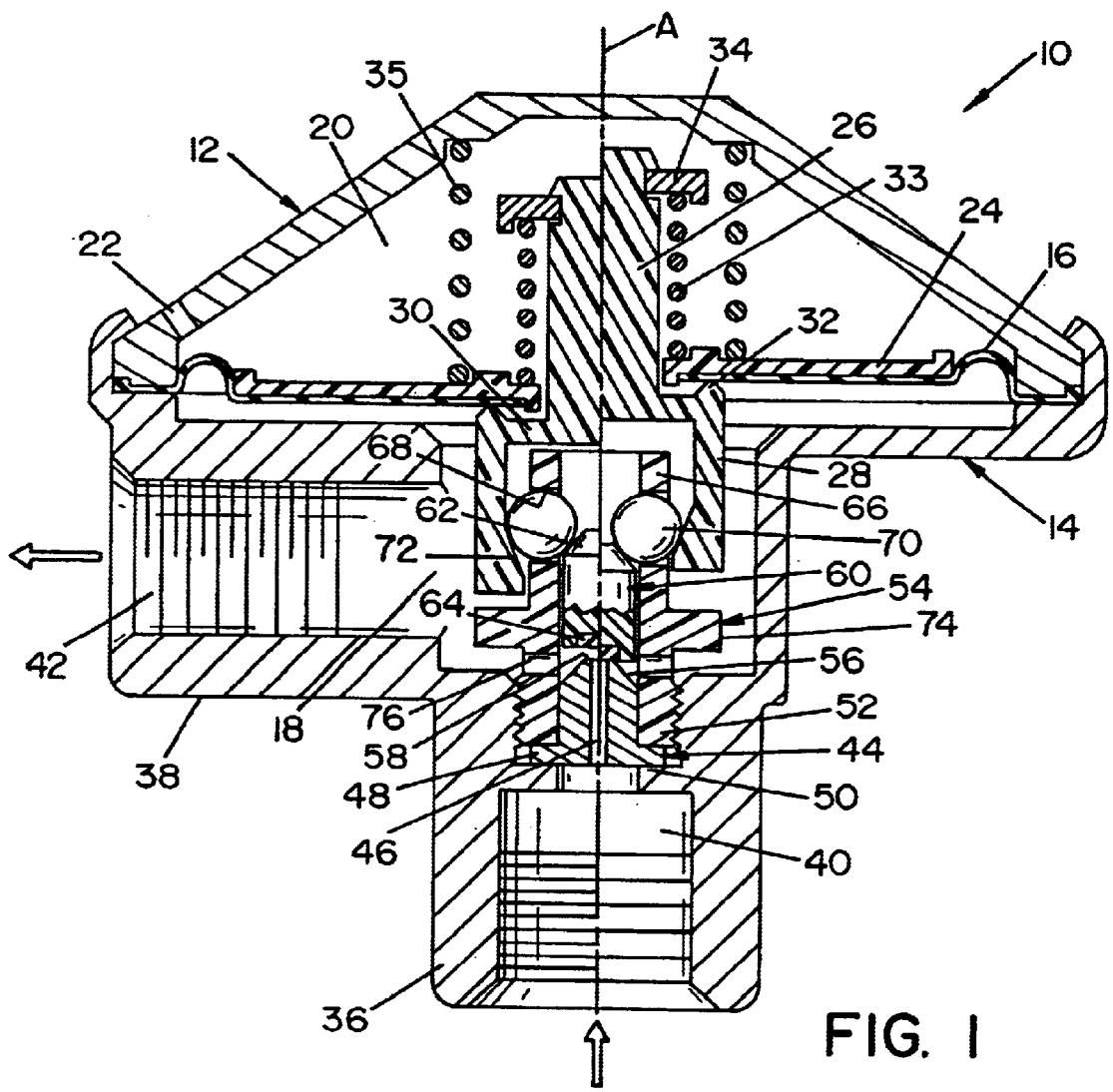
FIG. 1 is a sectional elevation view of a fluid flow pressure regulating valve having a valve element actuating arrangement in accordance with the present invention.
Figure 3:
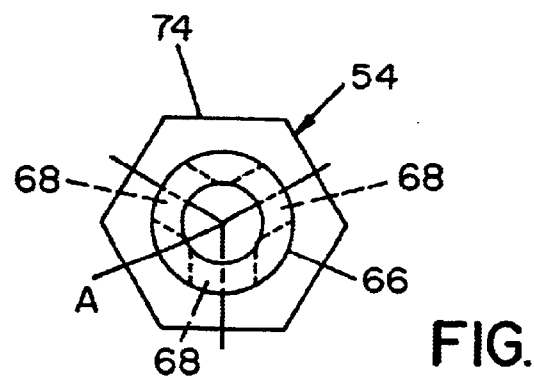
FIG. 3 is a plan view of a ball supporting sleeve component of the actuating arrangement; and, FIG. 4 is an elevation view, partially in section, of a modification of the housing for a pressure regulating valve in accordance with the invention.
Figure 2:
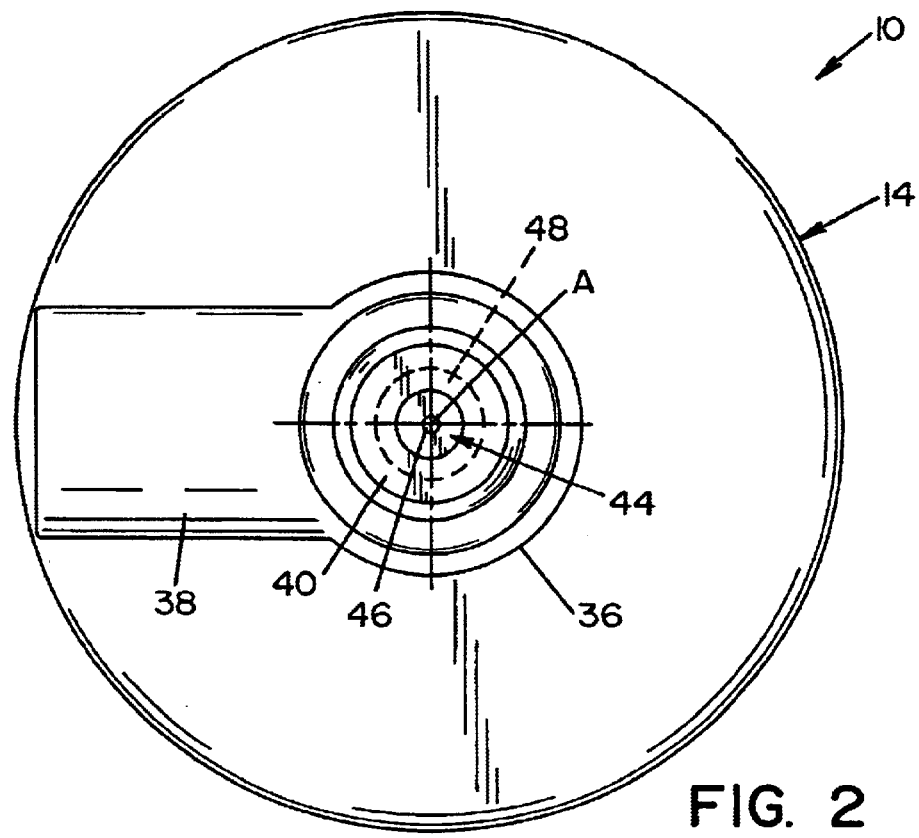
FIG. 2 is a bottom plan view of the pressure regulating valve.

Referring now in greater detail to the drawings, wherein the showings are for the purpose of illustrating preferred embodiments of the invention only, and not for the purpose of limiting the invention, FIGS. 1–3 illustrate a fluid pressure regulating valve 10 in accordance with the present invention and which comprises upper and lower housing members 12 and 14, respectively, and a flexible diaphragm 16 which is captured between the outer peripheries of the housing members to divide the interior of the housing into a pressure chamber 18 and a venting chamber 20 which is exposed to atmosphere through a vent opening 22 in housing member 12. The valve has an axis A and the diaphragm is transverse to and coaxial with axis A and is provided with a support plate 24 which, together with the diaphragm, is centrally apertured to receive the upper stem portion 26 of a valve element actuating component which is coaxial with axis A and displaceable with and by the diaphragm. The valve element actuating component further comprises a downwardly open circular sleeve member 28 which is connected to stem 26 by a radially outwardly extending wall 30 at the upper end of sleeve 28. Wall 30 has an annular relief valve seat 32 in chamber 18 and engaging the underside of diaphragm 16 and which seat is biased thereagainst by a relief valve spring 33 captured between support plate 24 and a collar 34 attached to the upper end of stem 26. A pressure regulating spring 35 is captured between support plate 24 and upper housing member 12 to provide a spring force against the diaphragm which determines the regulated output pressure of the valve.

Lower housing 14 is provided with an internally threaded neck portion 36 for connecting the valve to a source of gas under pressure which is supplied to chamber 18 as described in greater detail hereinafter, and chamber 18 communicates with an internally threaded semi-circular housing portion 38 by which the valve is connected to a point of use such as, for example, a gas cooking grill. Neck 36 provides an inlet passageway 40 for gas under pressure from the source, and housing portion 38 provides an outlet passage 42 from the valve. The flow of gas under pressure from inlet passage 40 to chamber 18 is through an orifice insert 44 having a restricted orifice 46 therethrough which provides an inlet port for the valve and is coaxial with axis A. Insert 44 has a radially outwardly extending peripheral flange 48 at the outer or lower end thereof which engages against a shoulder 50 at the inner end of inlet passage 40 and by which insert 44 is held in place in housing member 14. More particularly in this respect, flange 48 is retained against shoulder 50 by the distal end of the externally threaded lower end 52 of a second sleeve member 54. Sleeve member 54 is coaxial with axis A and has a circular bore therethrough, not designated numerically, and the portion of insert 44 above flange 48 extends into the lower end of the bore. The inner or upper end of insert 44 includes a conically tapered surface 56 providing a valve seat 58 at the outlet end of inlet port 46 and which is transverse to axis A. A circular valve element 60 is received in the bore in sleeve member 54 adjacent the outlet end of inlet port 46. Valve element 60 is coaxial with axis A and has axially opposite ends, one of which is provided with a conically tapered surface 62 and the other of which is transverse to axis A and provided with an axially inwardly extending recess receiving a rubber sealing member 64 which is adapted to engage with and disengage from seat 58 to respectively close and open inlet port 46 as set forth more fully hereinafter. The upper or inner end 66 of sleeve member 54 is received in sleeve portion 28 of the valve element actuating component and is provided with at least two and preferably three circular openings 68 extending radially therethrough. Openings 68 are equally spaced apart about axis A, and each of the openings receives a corresponding steel ball 70. The inner surface of sleeve member 28 at the axially inner or lower end thereof is provided with a conically tapered surface 72, and balls 70 are radially captured between conical surface 62 of valve element 60 and conical surface 72 of sleeve member 28. Preferably, conical surface 62 is tapered in an angle of 45° relative to axis A and conical surface 72 is tapered at an angle of 20° relative to axis A. These tapers provide a desired mechanical advantage in connection with displacing the valve element to close inlet port 46 as described hereinafter, and it will be appreciated that the taper of conical surface 72 on the lower inner side of sleeve member 28 can vary depending on the force ratio requirements for different valve flow capacities. Moreover, it will be appreciated that the modification of the angle of taper which enables achieving a desired force ratio does not require any increase in the size of the envelope or housing of the valve. As best seen in FIG. 3, sleeve member 54 is provided with a tool pad flange 74 which facilitates screwing the sleeve into lower body portion 14 to secure orifice insert 44 therein, and the sleeve member is provided with a pair of diametrically opposed trim orifices 76 which communicate the outlet end of inlet port 46 with pressure chamber 18.

Assuming that inlet passage 40 is connected to a source of gas under pressure and that outlet passage 42 is connected to a point of use and that a control valve at the point of use is closed whereby there is no flow through valve 10, the gas pressure in chamber 18 displaces diaphragm 16 and thus sleeve member 28 upwardly, whereby conical surface 72 of sleeve member 28 cams balls 70 radially inwardly against conical surface 62 of valve element 60 which forces valve element 60 downwardly for sealing element 64 to engage seat 58 and close inlet passageway 46 as is indicated in FIG. 1 by positions of the component parts on the right-hand side of axis A. When the control valve at the point of use is opened, the gas pressure in chamber 18 is reduced, whereby spring 35 displaces diaphragm 16 and thus sleeve member 28 downwardly relative to chamber 18. Such downward displacement of sleeve 28 and thus conical surface 72 releases balls 70 for displacement radially outwardly of openings 68, whereby the gas under pressure in inlet passage 40 flows through inlet port 46 and displaces valve element 60 upwardly and away from seat 58 to open passageway 46 as is indicated in FIG. 1 by the positions of the component parts to the left of axis A. Gas from the source then flows through inlet port 46 and trim orifices 76 into chamber 18 and then out through outlet passage 42 to the point of use. Such flow through the valve continues as long as there is a demand at the point of use, and in connection with such gas flow through the valve, trim orifices 76 which are slightly smaller in diameter than inlet orifice 46 function with the latter office to promote uniform flow, the elimination of vibration, and a reduction of lockout pressure below the requirements therefor. More particularly in this respect, trim orifices 76 create a positive pressure or force against the lower end of valve element 60, thus loading surface 62 of the latter against balls 70 and the balls against tapered surface 72 to eliminate clearances therebetween and thus relative movement therebetween during operation of the valve. When the control valve at the point of use is closed, back pressure in chamber 18 displaces diaphragm 16 and thus sleeve member 28 upwardly whereupon balls 70 are displaced inwardly by conical surface 72 and against conical surface 62 of the valve element to provide the necessary mechanical advantage and operating force against the valve element and the gas pressure through inlet port 46 to displace valve element 60 downwardly to close the inlet port.

Another advantage of the valve actuating arrangement provided in accordance with the invention resides in the fact that pressure plate 24, the actuator comprised of stem 26 and sleeve 28, sleeve member 54 and valve element 60 can be produced by injection molding, from Delrin or the like, which further promotes economy with respect to production of the valve.

Figure 4:
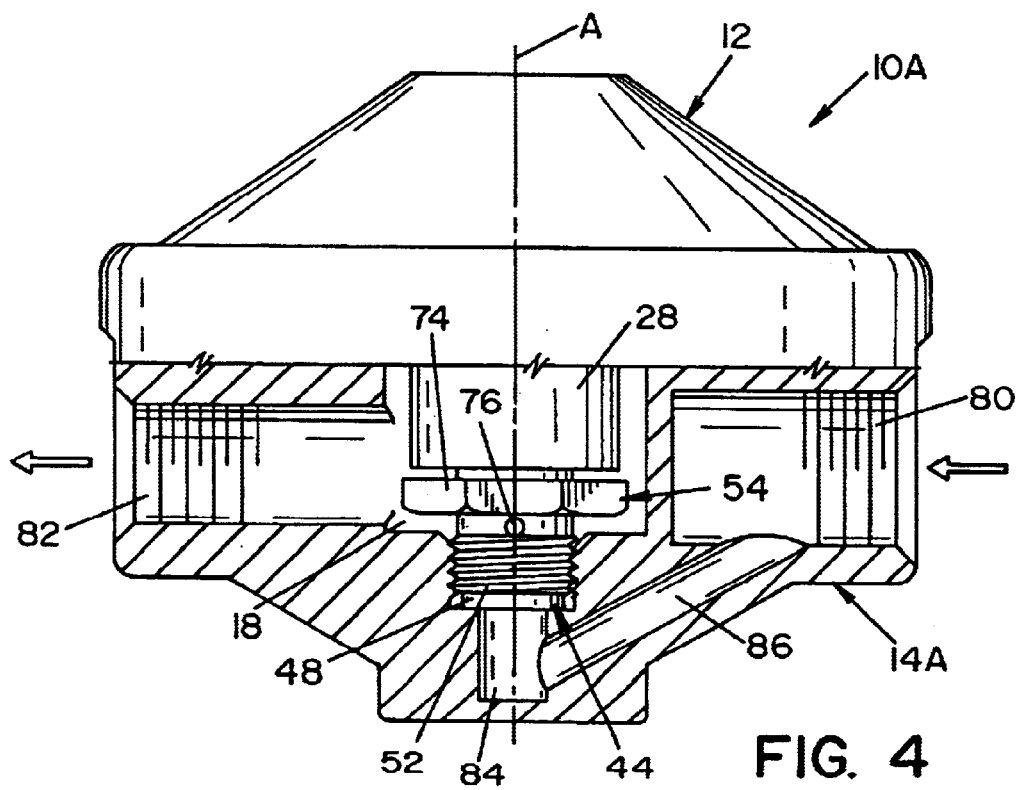

FIG. 4 illustrates a pressure regulating valve 10A incorporating a modification of the lower housing member of a diaphragm actuated pressure regulating valve in accordance with the invention, and which modification provides for in-line mounting of the valve. With the exception of the modification of the lower housing, the component parts of the valve are identical to those described hereinabove in connection with FIGS. 1–3 whereby like numerals are used in FIG. 4 to designate such component parts. Lower housing 14A of valve 10A comprises an internally threaded inlet passage 80 for connection to a source of gas under pressure and an internally threaded outlet passage 82 which is coaxial with passage 80 and by which the valve is connected to a point of use. Lower end 52 of sleeve member 54 is threadedly interengaged with housing member 14A as in the earlier embodiment to mount orifice insert 44 therein as will be appreciated from flange 48 of the insert shown in FIG. 4. The inlet end of the inlet port through the orifice insert communicates with a bore 84 which is coaxial with axis A, and inlet passage 80 is connected in a flow communication with bore 84 by means of an inclined passageway 86 therebetween. It will be understood that the operation of valve 10A is the same of that of valve 10 described hereinabove.

While considerable emphasis has been placed on the preferred embodiments herein illustrated and described, it will be appreciated that many changes can be made in the preferred embodiments and that other embodiments can be made without departing from the principles of the invention, whereby it is to be distinctly understand that the foregoing descriptive matter is to interpreted merely as illustrative of the invention and not as a limitation.

Having thus described the invention, it is so claimed:

1. A fluid pressure regulator comprising a housing having an inlet port and an outlet opening, a diaphragm in said housing, a diaphragm actuated valve element for controlling fluid flow from said inlet port to said outlet opening, said valve element having opposite ends, said inlet port having an axis, a first sleeve member supporting said valve element in said housing coaxial with said inlet port for linear displacement between first and second positions in which one of said opposite ends of said valve element respectively closes and opens said inlet port, said first sleeve member having an end spaced from said inlet port, a second sleeve member displaceable with said diaphragm between first and second positions relative to said first sleeve member and receiving said end of said first sleeve member, said second sleeve member having an actuating end spaced from said diaphragm, ball elements supported between said first and second sleeve members and the other of said opposite ends of said valve element for radial displacement inwardly and outwardly relative to said other end, said actuating end of said second sleeve member in said first position thereof displacing said ball elements radially inwardly against said other end of said valve element to displace said valve element to said first position thereof, and said actuating end of said second sleeve member in said second position thereof releasing said ball elements for displacement radially outwardly from said other end of said valve element releasing said valve element for displacement to said second position thereof.

2. A pressure regulator according to claim 1, wherein said ball elements comprise three spherical balls equally spaced apart about said first sleeve member.

3. A pressure regulator according to claim 1, wherein said first sleeve member includes radial openings therethrough receiving said ball elements.

4. A pressure regulator according to claim 3, wherein said ball elements comprise three spherical balls equally spaced apart about said first sleeve member.

5. A pressure regulator according to claim 1, wherein said other end of said valve element has a conical surface for engaging with said ball elements.

6. A pressure regulator according to claim 5, wherein said conical surface of said valve element tapers at an angle of 45° relative to the axis of said inlet port.

7. A pressure regulator according to claim 1, wherein said actuating end of said second sleeve member includes a conical surface for engaging with said balls.

8. A regulator according to claim 7, wherein said conical surface of said second sleeve member tapers at an angle of 20° relative to the axis of said inlet port.

9. A pressure regulator according to claim 1, wherein said outlet opening includes at least one passageway laterally through said first sleeve member.

10. A pressure regulator according to claim 1, wherein the one end of said valve element includes a planar surface transverse to the axis of said inlet port and said valve element includes a rubber sealing member secured in a recess in said one end.

11. A pressure regulator according to claim 1, wherein said first sleeve member includes radial openings therethrough receiving said ball elements and said ball elements comprise at least two spherical balls.

12. A pressure regulator according to claim 11, wherein said ball elements comprise three spherical steel balls equally spaced about said first sleeve member.

13. A pressure regulator according to claim 11, wherein said other end of said valve element has a conical surface for engaging with said ball elements.

14. A pressure regulator according to claim 13, wherein said actuating end of said second sleeve member includes a conical surface for engaging with said balls.

15. A pressure regulator according to claim 14, wherein said conical surface of said other end tapers at an angle of 45° relative to the axis of said inlet port.

16. A pressure regulator according to claim 14, wherein said conical surface on said actuating end tapers at an angle of 20° relative to the axis of said inlet port.

17. A pressure regulator according to claim 16, wherein said conical surface of said other end tapers at an angle of 45° relative to the axis of said inlet port.

18. A pressure regulator according to claim 17, wherein said ball elements comprise three spherical steel balls equally spaced about said first sleeve member.

19. A pressure regulator according to claim 18, wherein said outlet opening includes at least one passageway laterally through said first sleeve member.

20. A pressure regulator according to claim 19, wherein the one end of said valve element includes a planar surface transverse to the axis of said inlet port and said valve element includes a rubber sealing member secured in a recess in said one end.

* * * * *